(12) United States Patent
Strauss

(10) Patent No.: US 8,639,993 B2
(45) Date of Patent: Jan. 28, 2014

(54) ENCODING DATA TO ENABLE IT TO BE STORED IN A STORAGE BLOCK THAT INCLUDES AT LEAST ONE STORAGE FAILURE

(75) Inventor: Karin Strauss, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 12/943,953

(22) Filed: Nov. 11, 2010

(65) Prior Publication Data

US 2012/0124442 A1    May 17, 2012

(51) Int. Cl.
*G11C 29/00* (2006.01)
*G06F 11/00* (2006.01)

(52) U.S. Cl.
USPC .......................................... 714/723; 714/701

(58) Field of Classification Search
None
See application file for complete search history.

(56) References Cited

U.S. PATENT DOCUMENTS

| | | | |
|---|---|---|---|
| 4,051,354 A * | 9/1977 | Choate | 714/711 |
| 5,559,978 A | 9/1996 | Spilo | |
| 5,696,926 A | 12/1997 | Culbert et al. | |
| 6,263,452 B1 | 7/2001 | Jewett et al. | |
| 6,564,305 B1 | 5/2003 | Moore | |
| 7,743,233 B2 | 6/2010 | Wang et al. | |
| 2003/0023925 A1 * | 1/2003 | Davis et al. | 714/763 |
| 2005/0094459 A1 * | 5/2005 | Sesek et al. | 365/222 |
| 2009/0177932 A1 * | 7/2009 | Abts et al. | 714/704 |
| 2010/0037102 A1 | 2/2010 | Chen et al. | |
| 2010/0269000 A1 * | 10/2010 | Lee | 714/718 |
| 2011/0296258 A1 * | 12/2011 | Schechter et al. | 714/704 |

OTHER PUBLICATIONS

Magnusson, et al., "Efficient Memory Simulation in SimICS", Retrieved at << http://citeseerx.ist.psu.edu/viewdoc/download-?doi=10.1.1.5.7756&rep=rep1&type=pdf >>, Proceedings of the 28th Annual Simulation Symposium, 1995, pp. 12.

* cited by examiner

*Primary Examiner* — Gabriel Chu

(57) ABSTRACT

Techniques involving failure management of storage devices are described. One representative technique includes encoding data to enable it to be stored in a storage block that includes at least one storage failure. The data is encoded such that it traverses the storage failures when stored in the storage block. When it is determined that a storage access request has requested the data stored in a storage block having such failures, the data is decoded to restore it to its original form.

20 Claims, 11 Drawing Sheets

ENCODING DATA TO ENABLE IT TO BE STORED IN A STORAGE BLOCK THAT INCLUDES AT LEAST ONE STORAGE FAILURE

BACKGROUND

Errors affecting stored data may occur in memory and other storage devices as a result of soft errors or hardware failures. Soft errors generally refer to data errors caused by something other than a physical defect, such as alpha particle emissions, electrical noise, etc. When data is rewritten to the same storage location that previously exhibited a soft error, the error condition will likely be resolved. Hardware or "hard" errors, on the other hand, are not so forgiving. Physical defects within the devices storing the data are generally the culprits causing hard errors. When such physical defects occur, the affected storage cells may no longer be selectively written to desired logic levels, and in many cases are rendered unusable indefinitely.

As the building blocks of integrated circuits continue to decrease in size, process variation issues may become more prevalent. This can result in an increase in the permanent failures afflicting the storage device. Additionally, new storage technologies may exhibit higher hard failure rates than their more established counterparts. Particularly, while any storage technology may be vulnerable to hard failures, some are more susceptible than others. For example, modern phase-change memories (PCM) use currents that generate very high heat to set the electrical resistance when writing the cell. The expansion and contraction resulting from the repeated heating and cooling of the materials can eventually cause the heating element to detach from the cell material, thereby causing a permanent failure at a particular logic state. For these and other storage technologies, there are a variety of factors that can lead to hard cell failures.

In order to account for hard failures in memory and other data storing devices, the failed storage locations may be removed from service. This creates a noncontinuous address space that introduces additional complexities to designers and/or programmers. To make matters worse, data is often stored in addressable blocks of memory, and removing a failed storage location from service may result in decommissioning the entire memory block. For example, in the case of main memory in a computing environment, the memory block may correspond to a page of memory, thereby resulting in decommissioning an entire page of memory when any one or more cells of that page have failed. This essentially wastes the remaining operative cells of that page of memory, and furthers the depletion of storage capacity.

SUMMARY

Techniques involving failure management of storage devices are described. One representative technique includes encoding data to enable it to be stored in a storage block that includes at least one storage failure. The data is encoded such that it traverses the storage failures when stored in the storage block. When it is determined that a storage access request has requested the data stored in a storage block having such failures, the data is decoded to restore it to its original form.

In a particular implementation of such a technique, the encoding enables the data to be stored at operative storage cells of the storage block, while traversing the storage failures by skipping the cells that have failed. When decoding the data, bits at the failed cells are not utilized in the restored data.

In another representative implementation, the encoding converts at least some of the data to a code having bits set to a pattern of logic levels that corresponds to the pattern of logic levels of the storage failures. When the encoded data is stored, the bit pattern of the code maps onto the bit pattern of the storage failures. The encoded data thus traverses the storage failures by storing the data through the storage failures, thereby exploiting their failed states.

Still other representative implementations involve encoding the data through compression. The stored data traverses the storage failures by enabling the compressed data to be stored in the working segments of the storage block on either or both sides of the storage failures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
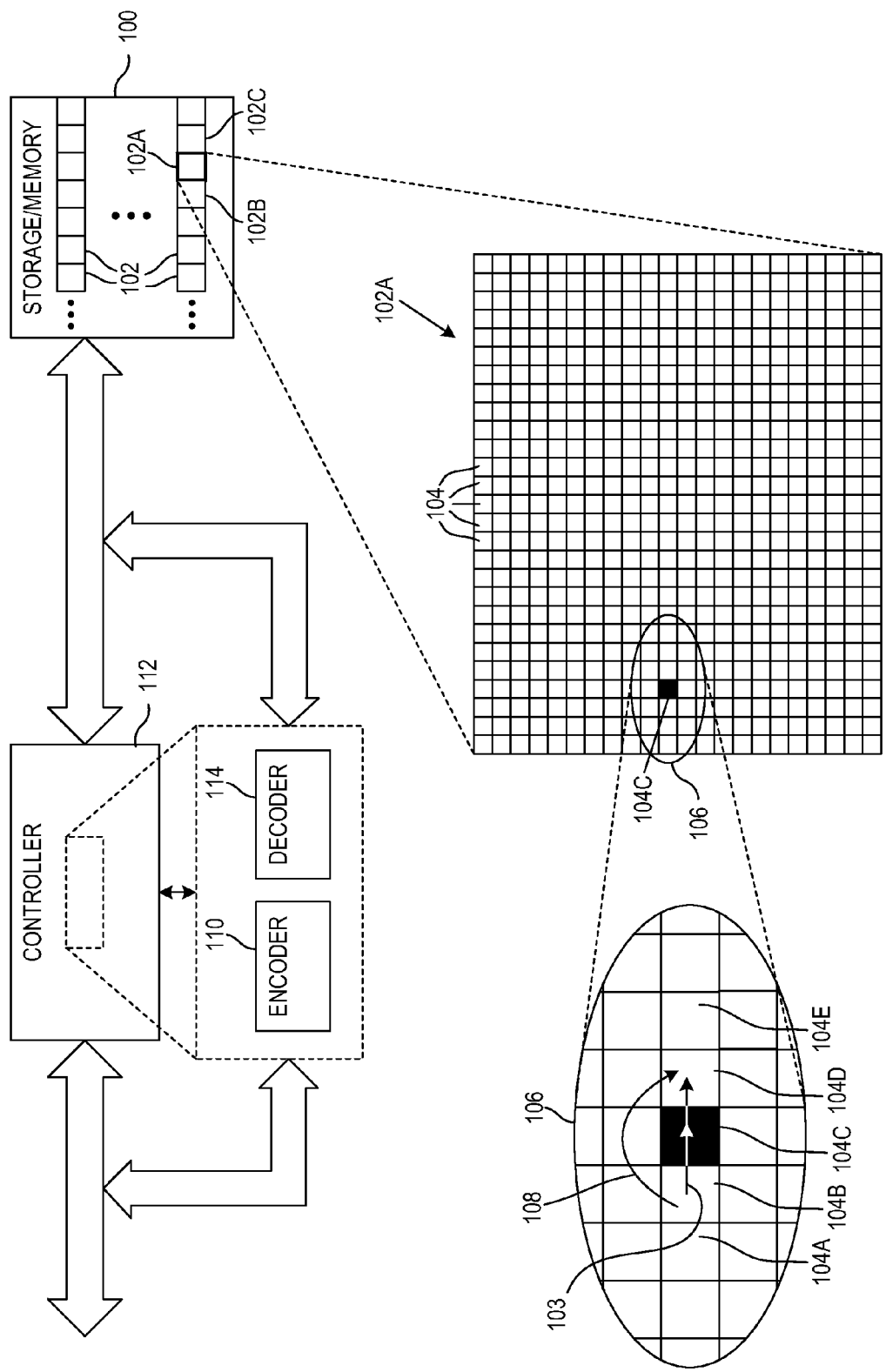
FIG. 1 illustrates a representative manner in which data may be encoded to adjust to hard failures afflicting a storage block.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to managing memory and other storage failures. Errors affecting stored data may occur in memory and other storage devices as a result of soft errors or hardware failures. While any storage component is vulnerable to hardware or "hard" failures, some storage technologies are more susceptible to such failures than others. In some instances, increases in hardware process variation and characteristics of new storage technologies may exacerbate the problem, thereby causing a general increase in the permanent failures observed in such devices. While error correction techniques may be used, they can only correct a limited number of errors. For example, Error Correction Codes (ECC) may be used to check for and correct a limited number of data errors. A code representative of the bit sequence in the data is calculated and stored with the data. When the data is read, the code calculation is again performed, and the result is compared with the code that is stored with the data. If the codes match there is no error. If the codes do not match, a comparison of the codes can provide information as to where in the data the bit error(s) resides. Error-Correcting Pointers (ECP) may also be used for memories in which permanent errors occur, where addresses of failed cells are stored and additional cells are allocated to replace them. However, such solutions can only correct a limited number of data errors. Further, they may involve data overhead that reduces available storage/memory space. While the techniques described in the disclosure can be used independently of any error correction techniques, the techniques described herein may also be used when error correction resources have been exhausted, in which case some bits previously used for error correction can be reclaimed.

Permanent failures can also fragment the working address space of storage blocks. In the case of block writes and reads to/from a memory, a hard failure exhibited anywhere in the targeted memory block has traditionally resulted in removing the entire addressable memory block from service. For instance, an entire page of memory, which corresponds to the finest granularity of address translation in a virtual memory system, is commonly decommissioned when any one or more cells of the corresponding physical memory exhibit a hard failure. The remaining operative cells neighboring the failed cell(s) in the decommissioned page are wasted, which can lead to unacceptable diminution of precious storage resources.

If a page or other addressable segment of memory is not entirely decommissioned, permanent failures fragment the working address space of memory blocks, and create complexities in trying to use the remaining working cells of those segments. For example, fine-grain address translation in memory paging systems defragments the address space at the cost of, for example, higher translation lookaside buffer (TLB) miss rates. Another exemplary complexity is the use of smart memory allocation and relocation of objects with failing bits by managed runtimes, which defragments the address space only for programs running with the aid of a managed memory manager/garbage collector, and therefore lacks generality. Smart memory allocation and whole-page relocation by system software would rely on finding a compatible page in which to copy the data stored by the original page suffering the failure, which is computer-intensive and becomes more difficult as failures accumulate. As noted above the use of Error-Correction Pointers or other hardware cell replacement is limited to the hardware resources present in the storage/memory chip, and once the error-correction resources are exhausted, address space fragmentation begins to occur.

The present disclosure addresses these and other issues arising from hard failures in memory devices and other data storage devices. The disclosure reveals manners in which the operative cells sharing an addressable storage block with one or more failed cells can remain in service for storing data. Among other things, this obviates the need to decommission entire addressable storage blocks in view of failures affecting less than all of the cells of that addressable storage block. Some or all of the remaining cells of an addressable storage block that have not exhibited a failure condition may remain in use, while avoiding or exploiting the failed cells of that storage block. Continued utilization of addressable storage blocks exhibiting a hard failure(s) also reduces complexities arising from accessing noncontinuous address space in a memory or other storage device.

Information may be encoded to allow data to be stored in the storage block, while avoiding data corruption by properly managing the manner in which the data is stored in view of storage cell failures. For example, data may be stored in cells of the storage block until reaching a failed storage cell. The failed cell may be skipped, and data storage can resume following the failed cell. Information encoded into the stored data facilitates data decoding by providing, for example, information regarding the location of the failed storage cell within the particular storage block. Bits read from the failed storage locations can be disregarded as prescribed by the encoded information, while retaining other data that is read from the data block. In this manner, data may be encoded to traverse a cell failure(s) when the data is stored in the data block exhibiting the cell failure.

In another example, addressable storage blocks exhibiting a cell failure may remain in use by exploiting a failed logic state of a cell failure. This allows data to be stored in both the operative and failed storage cells of the particular data block. At least some data is encoded so that one or more bits of the encoded data will match the failed logic states of a corresponding number of the cell failures. When the encoded data is stored in the storage block, the encoded data maps onto the bit pattern of the cell failure(s), thereby allowing fixed logic levels of failed cells to be utilized. When the encoded data is read from the storage block, the logic states of the failed cells provide the correct bits for the encoded data. The encoded data may then be decoded to arrive at the original form of the data prior to the encoding. In this manner, data may be encoded to traverse a cell failure(s) when the data is stored in the data block exhibiting the cell failure. Compression techniques may alternatively or additionally be used to avoid failed cells, and to account for an otherwise decreasing memory capacity.

The disclosure presents, among other things, representative embodiments in which operative memory cells can remain in use while failed memory cells can be avoided, skipped, and/or utilized in their failed state. For purposes of illustration and not of limitation, embodiments describing devices capable of storing data may be described in the context of "memory" devices, but the principles are equally applicable to any volatile or non-volatile storage device technology, at any stage of its use in a computing environment. Thus, references to "storage" or "memory" may be used interchangeably, and use of either one is not intended to be limiting to any particular type of storage/memory device unless otherwise noted. References to storage or memory "blocks" generally refer to any size of data segment that may be stored or otherwise accessed from the storage or memory device. Further, reference to storage or memory "cells" is not intended to connote any particular memory or storage technology, but rather to generally refer to any structural unit(s) capable of recording the state of a data bit(s).

FIG. 1 illustrates a storage device 100 representing any type of storage technology involving an indeterminate number of addressable memory blocks 102. Each addressable block 102 stores multiple data bits. For example, each addressable block 102 may correspond to a page of memory having, for example, up to many kilobytes of memory cells 104. Any one or more of the cells 104 can fail, which generally refers to a state where a cell 104 is unable to correctly or reliably change or store its data state as expected. If such a hard failure occurs in a memory block 102A, the entire memory block 102A could be decommissioned for use. Such a solution wastes the otherwise operative cells 104 within that block 102A. Where a storage/memory block has a cell failure(s) and an attempt is made to use remaining cells, the addressing space may become fragmented where other techniques such as error correction reach their useable limit. The internal fragmentation in the memory block may result in decommissioning that block. Representative embodiments described below enable up to full utilization of the remaining operative cells 104 in a block 102 having at least one failed cell, while preserving a continuous address space that is not fragmented across memory blocks.

A section 106 of the cells is depicted in an expanded view for ease of illustration. Referring to contiguous cells 104A-104E, assume that a memory cell 104C is determined to exhibit an unrecoverable hard failure. One embodiment involves encoding the data targeted for storage at the block 102A having at least one failure 104C. In one example, the data may be encoded to specify the location of the failed cell(s) 104C, and to indicate a manner of jumping over or otherwise skipping the faulty or unreliable data at the failed cell(s) 104C when later obtaining the data from that memory block 102A. This is depicted by arrow 108, illustrating that valid data may be stored at cells 104A, 104B preceding the failed cell 104C, and continues from cell 104D after the failed cell 104C.

In another example, one or more cells 104C may fail in a particular state, which can be determined by the system. In essence, the data bits at such locations can become "stuck at" particular logic levels. While the reasons in which cells permanently fail at a particular logic level may vary, some storage technologies naturally exhibit such tendencies. For example, resistive memories arrange atoms within a cell to set its resistance to store a particular data state. Such technologies include, for example, spin-torque-transfer magnetoresistive memory (STT-MRAM), ferroelectric memory (FRAM), memristors, and phase-change memories (PCM). Considering PCM as an example, currents generating high heats are used to set the electrical resistance when writing the cell. One reason that phase-change memories may exhibit cell failures is due to the expansion and contraction resulting from the repeated heating and cooling of the materials. This can eventually cause the heating element to detach from the cell material, thereby causing a permanent failure at a particular logic state. This is just one example, as there are numerous causes for permanent cell failures in PCMs and other storage/memory devices.

Such permanent cell failures can later be read, but cannot be rewritten to a state different than the "stuck at" state. In one embodiment, bit patterns in the original data are encoded into a different set of patterns. The new encoding maps the value of bits intended to be stored in a particular failed cell to the value at which the cell is stuck. This is depicted in FIG. 1 by the line 103 passing from cell 104B to cell 104D through the failed cell 104C. In this manner, the permanently failed state of the cell 104C is utilized by recognizing its failed logic level, and properly encoding the original data such that one or more of the encoded data bits has the same bit pattern as the failed cell(s) 104C on which they are mapped. By mapping the encoded data onto the bit pattern of the failed cell(s) 104C, the data is passed through the cell failure(s) 104C without losing or otherwise corrupting any of the data stored in the memory block 102A. The principles set forth in the present disclosure can be applied in any type of storage in which data locations can become stuck at particular logic levels.

Embodiments that involve encoding to traverse the cell failures 104C in these manners, e.g., passing over or through the cell failures, enable a continuous address space to be maintained. Such embodiments involve adapting to or working around the cell failures 104C to allow the data to be stored at the remaining operative cells 104 of the memory block 102A.

In addition to preserving memory space and maintaining a continuous address space, memory space lost as a result of accumulating failures can be recovered through the use of compression techniques. As memory failures accumulate, the memory capacity naturally decreases. Compression, which is a form of encoding, may be used to recover the lost memory capacity. In one embodiment, the data of a memory region is compressed prior to applying the encoding techniques described above. For example, the data may be compressed prior to encoding the data in order to skip over failed cells, or in order to pass through failed cells having stuck data logic levels. In another example, the original data may be compressed to fit within an area of operative cells that is located on either side of the failed cell(s) in that block. In another embodiment, the data of a memory region is compressed after applying other encoding techniques described herein. In one example, cell failure location information and/or other metadata is encoded with the data to be stored, and the collective data, failure location information and/or other metadata is then compressed to reduce the memory capacity required to store this information. The disclosure contemplates independently using compression to avoid one or more failed cells in an area of the memory block, as well as using compression in combination with other encoding embodiments described herein.

The encoding functions may be implemented, for example, using a separate encoder 110. Alternatively, it may be encoded via a processor (not shown), implemented in a memory controller 112, or the like. Instead of storing the raw data directly into the memory block 102A of the storage/memory 100, the memory controller 112 or other entity such as the encoder 110 that responsible for the encoding will identify which bit(s) of the block have failed, and will provide an encoding that works around those failures. When a memory access request targets the data stored at a memory block 102A having a hard failure(s), a decoder 114 decodes the data to return it to its original form prior to the encoding. The decoder 114 may be a separate component, or integrated into other circuitry such as the controller 112. The encoder 110 and/or decoder 114 may be implemented using hardware, firmware, software or any combination thereof. Exemplary encoding and decoding functions are described in greater detail below.

Embodiments presented in the disclosure enable a computer-readable medium, such as the storage/memory 100, to store data at addressable data blocks having storage/memory cell failures. Upon storing the data, the storage medium may have stored thereon a data structure that includes, for example, one or more data fields containing original or encoded data that is subject to a write command. Such a data structure may also include fields containing location information identifying the location(s) of failed cells and/or a location within a data block in which to resume storing data following a cell failure. Other representative data structure fields may alternatively or additionally be provided, such as a field in which a notification is provided to enable a decoding mechanism to identify the data block as including encoded information in which decoding will be applied. Still other representative data structure fields may include encoded information positioned proximate a failed cell(s) in order to identify one or more following cells as failed cells.

A computer-readable medium such as the storage/memory 100 may therefore utilize the operative cells, and in some cases the failed cells, within the storage block exhibiting a cell failure(s). In one embodiment, a storage device includes a failed storage cell(s) within an addressable block of storage. The storage device further includes operative storage cells on both sides of the failed storage cell, where the operative storage cells store a data block in the addressable block of storage, yet traverse the failed storage cell without experiencing data corruption when stored in the addressable block of storage.

Figure 2:
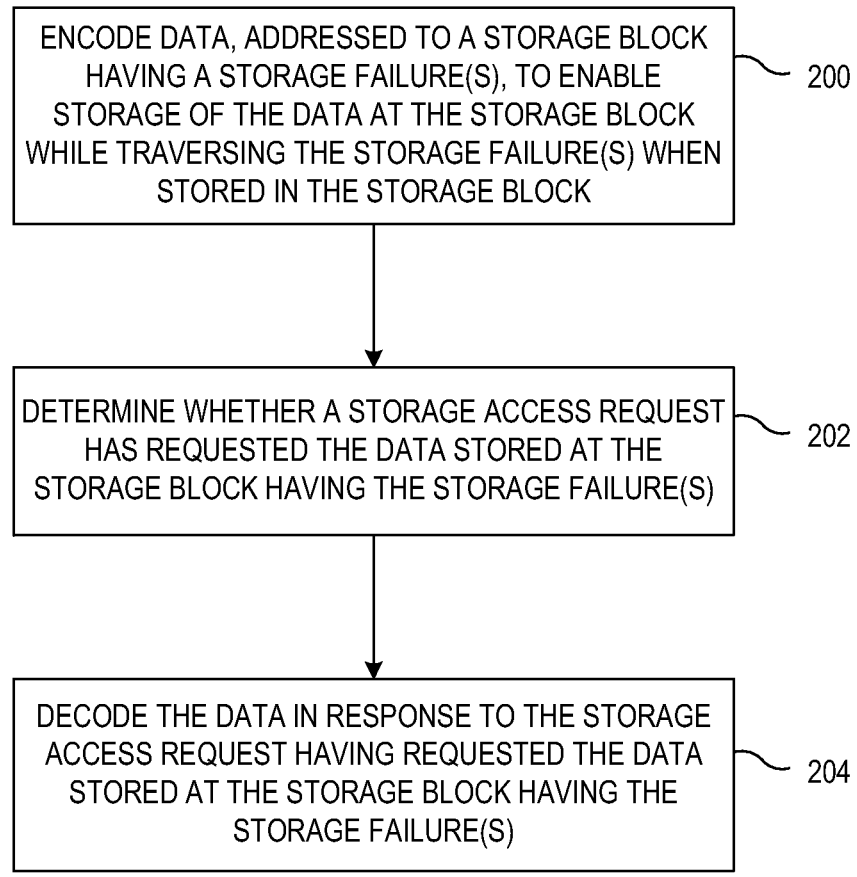
FIG. 2 is a flow diagram illustrating a representative manner for managing data storage and access in an addressable block of storage having one or more storage cell failures.

FIG. 2 is a flow diagram illustrating a representative manner for managing data storage and access in an addressable block of storage having one or more storage cell failures. The storage block may be of any addressable size in which a block of data may be written, such as a page, cache line or other addressable data block sizes. Data, which is addressed to or otherwise targeted for storage in a storage block having at least one storage failure, is encoded as shown at block 200. The data is encoded to enable storage of the data at the storage block while traversing the one or more storage failures when the encoded data are ultimately stored or written into the storage block.

Traversing the storage failure may involve, for example, jumping across or over the failed cells to avoid storing the valid data at the failed locations. This may be accomplished by encoding data to facilitate storage of the data up to the one or more failed cells, and to indicate a memory position following the failed cells at which data may again be stored. For example, such an encoding may involve storing at least some of the data prior to the failed cells. An encoded symbol(s) or code(s) may be positioned immediately adjacent to, or at least prior to, the failed cell to identify the location of the failed cell. In another embodiment, the encoded symbol(s) may be positioned following the failure(s). For example, if the cell failure is located at or near the beginning of the block, one embodiment involves storing the encoded symbol(s) after the cell failure. The location of the failed cell may be determined in advance, or at the time in which the data is to be stored. Determination of the location of failed cells is discussed in greater detail below, including the description provided in connection with FIGS. 3, 4 and 6.

In an alternative embodiment an encoded symbol may be placed at any location in the data block, such as at the beginning of the data block to facilitate easier identification of the symbol when later decoding the data. An address of a subsequent valid data location following the failed cells may also be encoded into or stored with the data to indicate the memory location at which valid data is again stored following the failed cell. Again, this may be encoded to be positioned proximate the failed storage cells, or at any other position of the data block such as at or near the start of the data block. Rather than providing an address of a valid data location following a failed cell, another representative embodiment involves encoding a number of data cells or bits to skip or jump over to avoid the failed cell(s). Whether using an address, a number of skipped cells or otherwise, the location of the storage cell in which to resume storing data following a hard failure may be the location immediately following the hard failure or any succeeding location. While these examples illustrate representative manners of how data may be encoded to skip over, pass through or otherwise avoid failed storage cells, other encodings may be used to indicate the location of the failed cells and specify the available cells following the failed cells.

In another embodiment, traversing the storage failure involves storing the data block into the addressed storage block such that the bits of a portion of the data block map onto the failed cells. For example, where one or more storage cells have failed in a known state (e.g., a logic state 0 or logic state 1 in a binary storage device), the data may be encoded or shifted to ensure bit-for-bit mapping of valid data onto the failed cells. This may be accomplished by encoding at least a portion of the data to a new bit pattern to map onto the one or more failed cells.

Data may be encoded through compression techniques to avoid or otherwise traverse the failed cells. For example, data may be sufficiently compressed to fit within an area of the addressed storage block that does not have failures. In another embodiment, the data may be encoded such that it is compressed, and further encoded to pass over or through the failed cells as described above.

Thus, encoded data may be stored at one or more addressable storage blocks of the storage device. When requests to retrieve the data stored at blocks having cell failures are made, the encoded data will be decoded to provide the original data to the requester. As shown at block 202 of FIG. 2, a determination is made as to whether such a storage access request has been made to data stored at a storage block having a storage failure. For example, the encoded data may be examined to identify any encoding indicating that the data block has been encoded due to a hard failure in the targeted storage block. The entire data block may be examined to find such an indication. Alternatively, the system may have knowledge of where such indication may be stored in the data block, such as at the beginning of the data block or in the storage cells immediately preceding the failed cell(s).

In other embodiments, the determining of block 202 includes referring to a record of failed storage locations to determine whether a storage access request is targeting a storage block where encoded data has been stored. For example, a table of known hard failures may be maintained with addresses of known cell failures in the storage device. The address of failed storage locations may be determined in any manner, such as through application of a power-on self test (POST) or the like. Reference to such a table or other stored record of the hard failure locations can indicate which data blocks include hard failures and consequently the encoded data. These and other manners may be utilized for making the determination of block 202 as to whether a storage access request has requested the data from a block having at least one hard failure.

In response to determining that a storage access request indeed targeted encoded data from a block having a hard failure(s), the encoded data is decoded as shown at block 204. In one embodiment the decoding methodology to be used depends on the encoding methodology used. For example, assume the encoding provides information at the start of a data block to specify the location of a cell failure and an indication of where to store data following the failure. In this example, the decoding will look to the start of the data block to identify this information and will recognize this information as metadata that is not part of the original data block. The decoding can also append the valid data following the failure location to the data preceding the data failure to reproduce the original data.

In some embodiments, the encoding shown at block 200 may also provide information as to the particular encoding methodology used, in which case the decoding of block 204 would involve utilizing this information to otherwise decode the data. The encoding methodology information may be stored in an encoded form, or may not be encoded. The encoding methodology information may be stored anywhere within the storage device, including but not limited to locations at or near the start of the storage block exhibiting the failure, proximate the cell failure(s) itself, or elsewhere. In one embodiment, the encoding methodology information is encoded and stored with other encoded data identifying the location(s) of the failed storage cell(s).

Among other things, the features of FIG. 2 demonstrate encoding techniques that may include re-coding bit patterns in the original data into a different set of bit patterns, such that the new encoding can tolerate the lack of address space continuity, yet fit in the same space that the original data would occupy. The encoding may also involve compression techniques to provide for a substantially constant storage size as storage cell failures accumulate.

Figure 3:
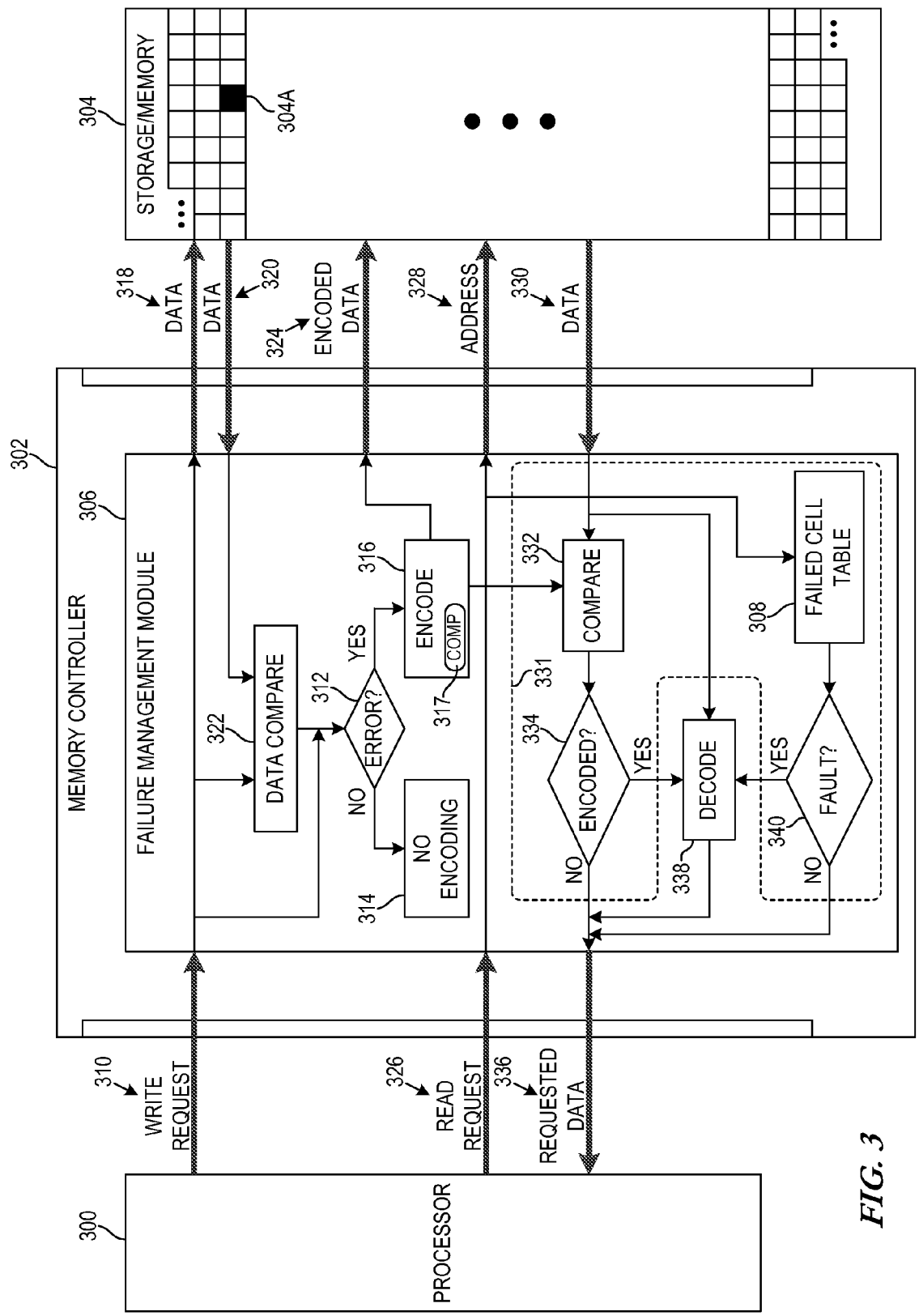
FIG. 3 is a block diagram illustrating a representative embodiment for managing hard failures in a storage device.

FIG. 3 is a block diagram illustrating a representative embodiment for managing hard failures in a storage device. For purposes of illustration and not of limitation, this example assumes that the storage device is a memory device. In one embodiment, the encoding and/or compression techniques are applied at a memory block granularity, such as a cache line. A processor 300 or other component capable of initiating read/write requests is coupled to a memory 304 by way of a memory controller 302. A failure management module 306 serves to intercept requests from the requester (e.g., processor 300) and take action to manage cell failures in the memory 304. In one embodiment the failure management module 306 is implemented on the path between the requesting processor 300 and the memory 304, such that addresses and data passed between the requesting processor 300 and the memory 304 will go through the failure management module 306.

In one embodiment, the processor 300, memory controller 302, failure management module 306 and memory 304 are coupled on a common apparatus. For example, the functional modules shown in FIG. 3 may be implemented on a single die, or may be provided on one or more chips comprising a chipset. In another embodiment, the modules 300-306 are implemented in one or more chips or components operatively coupled on a fabricated printed circuit board (PCB) such as a computer motherboard or other PCB providing processing services. In some embodiments one or more of the functional modules 300-304 may be on a separate board(s) from the other functional modules. For example, the storage/memory 304 may be remote from the processor 300, controller 302 and failure management module 306. Such remote storage/memory 304 may be on a separate printed circuit board (e.g., memory card), or even in a different system that is accessible remotely. Accordingly, the visual depiction of the various functional features of FIG. 3 is not intended to suggest any particular physical partition of components, as the various functional features can be implemented in any fashion ranging from, for example, being integrated on a single die to being entirely physically distinct from one another. In one embodiment, all or part of the failure management module 306 may be implemented in hardware. In other exemplary embodiments, the failure management module 306 may be implemented in firmware, software running on a microcontroller or other device, or any combination of hardware, software and firmware.

The failure management module 306 is depicted as part of the memory controller 302, although the failure management features may be implemented independently and separate from any memory controller 302. In these cases, there may be communication between the failure management module 306 and a memory controller 302. The communication may be used to coordinate the respective responsibilities of handling memory read and write requests affecting physical memory blocks that have hard failures and those that do not.

Failed cell locations 304A in the memory 304 may be, in some embodiments, known in advance. The failure recognition may be determined using techniques such as a power-on self test (POST) or other diagnostics of the memory 304, or through error discovery and/or correction techniques that are able to pinpoint failed cells, etc. The addresses of failed cells may be stored within the processor 300, memory controller 302, failure management module 306 or elsewhere. For example, such addresses may be stored in a failed cell table 308. When a write request 310 for one or more pages of data is issued, it can be determined at block 312 whether the targeted memory block includes a hard failure(s) through comparison of the addresses. If there is no such failure, the data may be stored normally without encoding at shown at block 314; otherwise block 316 shows that the data may be encoded to traverse the failed cells.

In other embodiments, hard failures are identified at the time of the attempt to write the data to the memory 304. The data 318 associated with a write request 310 is written to the memory 304. After writing, the same data 320 is read back, and as shown at block 322 is compared to the data 318 that was attempted to be written. If the comparison of block 322 shows no differences, there is no failure in any of the memory cells as determined at block 312, and the data written may remain stored in the data in its original form without encoding as shown at block 314. If the data does not match, the data bits having differing values suggest cell failures as determined at block 312, and as depicted at block 316 at least some of the data may be encoded to traverse the failed cells. The encoded data 324 is then stored in the same memory block exhibiting the hard failure(s), thereby making use of the remaining cells of the memory block and maintaining a continuous address space. In one embodiment, the process of writing, reading back, and checking the data for cell failures may be performed again after the data has been encoded. For example, a cell failure(s) may occur when writing the encoded data 324, so the same encoded data may be read back and compared to the encoded data that was attempted to be written. These and other manners of identifying failed cell locations to determine whether to encode the data may be implemented.

At some time a read request may be issued by the processor 300 or other requester to retrieve the data at a memory block having at least one failed cell, such as memory block 304A. The failure management module 306 intercepts the read request 326, and using an address 328 identified in the read request 326, the corresponding data 330 is retrieved. A data block identification module 331 can determine whether the memory access request has targeted the data stored at a memory block known to have a failure(s). In one embodiment, the data block identification module 331 determines whether retrieved data has been previously encoded. Block 332 shows that this may be accomplished by comparing some or all of the retrieved data 330 to some information known from the encoding process of block 316. For example, a particular symbol(s) may be encoded as shown at block 316 into the data when at least one cell failure occurs. The data can be examined, such as through the comparison shown at block 332, to determine if this symbol(s) is present in the retrieved data 330. If the retrieved data had not been previously encoded as determined at block 334, the requested data 336 may be provided to the requester 300 in the form that the data 330 was retrieved from the memory 304. If it is determined at block 334 that the retrieved data 330 is encoded through the comparison at block 332 or other examination of the data, the retrieved data 330 is decoded as shown at block 338 and provided to the requester 300. In one embodiment, the decoded data represents the requested data 336, in the original form prior to the encoding of block 316.

In another embodiment, information other than the data may be examined by the data block identification module 331 to determine if the data at the particular memory block has been encoded. For instance, where data is retrieved from a data block known to have at least one failed cell, the data may be presumed to be encoded, and decoding can be initiated without analyzing the data itself. In one embodiment, the addresses of data blocks having been encoded may be stored, such as in a failed cell table 308. In this case, the address 328 can be compared to addresses of data blocks known to exhibit at least one cell failure. If it is determined 340 that there is no cell failure at the requested data block address, the requested data 336 can be returned in the form of the data 330 retrieved from the memory 304. If it is determined 340 that a cell failure(s) exists at the requested data block address, the retrieved data 330 is decoded 338 and provided to the requester 300. In one embodiment, the decoded data represents the requested data 336, in the original form prior to the encoding of that data shown at block 316.

In one embodiment, the encoder 316 also includes a compression module 317 to compress the data in addition to applying other encodings. In one embodiment, the data is compressed prior to encoding, and the compressed data may then be encoded to traverse failed cells. For example, the data may be compressed, and the compressed data may then be encoded to skip one or more failed cells. In another example, the data may be compressed, and the compressed data may be encoded to map onto fixed logic states of one or more failed cells. The encoding and compressing techniques may be implemented separately, or may be combined into a single process that both encodes and compresses the data as desired. By compressing the data in addition to implementing other encodings, a reduction in memory capacity due to accumulating cell failures can be managed by reducing the number of bits to be written to the targeted memory block.

Figure 4:
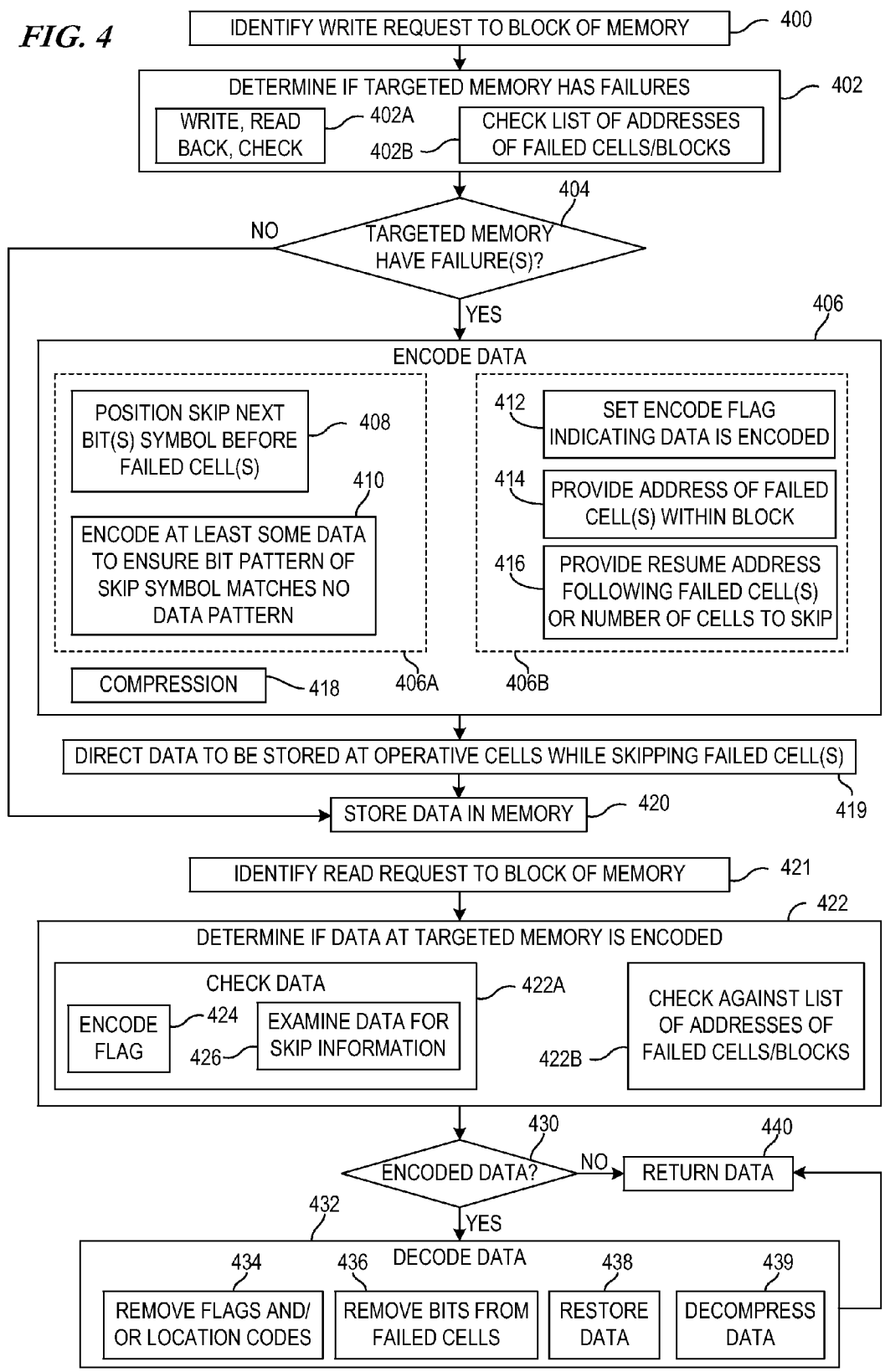
FIG. 4 illustrates a representative method for encoding data to skip over failed cells in a memory block.

As noted above, various encoding techniques may be used to preserve a continuous address space within a page or other address translation granularity. One technique involves recoding bit patterns in the original data into a different set of patterns, such that the new encoding can tolerate the lack of address space continuity while still fitting into the space that the original data would occupy. In one embodiment, at least one of these encoded bit patterns, also referred to as symbols or codes, indicates the position of the next valid symbol where it is not the following cell/bit. FIG. 4 illustrates a representative method for skipping failed cells in this manner.

According to the embodiment depicted in FIG. 4, a write request to a block of memory is identified as shown at block 400. For example, a write request from a processor may include the data block to be written, an address at which to write the data block, as well as a write signal indicating a write operation. It is determined at block 402 whether the targeted memory block has any cell failures. Alternative representative manners of making the determination of block 402 are depicted. As shown at block 402A, the data block may be written to the memory, read back from the memory, and compared to the data that was written. If the written data does not match the read data, a comparison can indicate which cell(s) has failed. In another example shown at block 402B, a list of page or other block addresses known to have failed cells may be consulted. Other manners of making the determination of block 402 as to whether the targeted memory has encountered hard failures may also be employed.

Figure 5A:
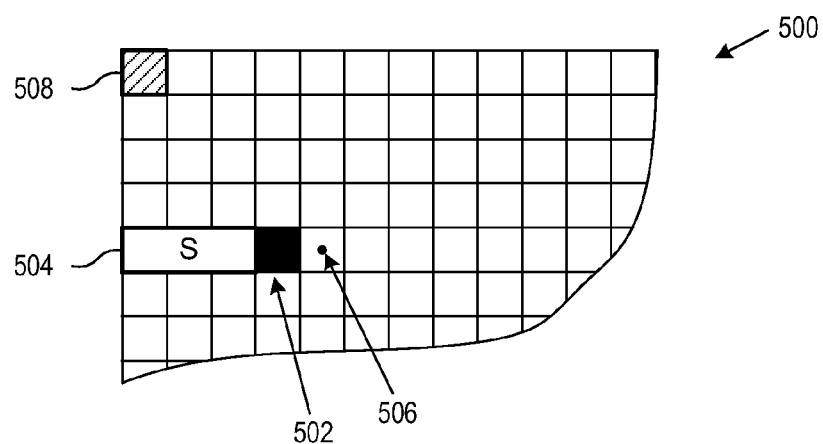
FIGS. 5A and 5B depict alternative exemplary embodiments for indicating the location of failed cells in a memory block.

If the targeted memory has failures as determined at block 404, the data will be encoded as shown at block 406 to enable the one or more failed cells to be skipped over. Thus, in the illustrated example, the data to be stored will be written to operative cells before and after the failed cell(s) while skipping those cells that exhibit failures. FIG. 4 provides representative examples in which this may be implemented. Block 406A provides an example in which encoded data is positioned proximate the failed cell(s) to indicate where the failure is located and where to resume storing data following the failure. As shown at block 408, a symbol indicating that a failed cell(s) is to be skipped over may be positioned proximate a failed cell, such as immediately before the failed cell(s). The placement of the symbol itself may indicate where the skipping of the failed cell(s) is to begin, or other information such as an absolute or relative address may be encoded into the symbol to indicate where the skipping of a failed cell(s) will begin. In one embodiment, the symbol may include or be accompanied by a number of failed cells to skip or an absolute or relative address where valid data resumes following the failed cell(s). An example of using such a symbol is illustrated in FIG. 5A, which depicts a portion of a targeted memory block 500 having at least one failed cell 502. The encoding includes providing at least one bit pattern or symbol 504 that indicates the position of the next valid data 506 if it is not the following bit. Encoded information such as the bit pattern(s) or symbol(s) 504 may include, for example, an address or a number of bits to skip. In one embodiment, an indicator 508 may be encoded into the data to signify that the memory block 500 includes encoded data. Returning to FIG. 4, block 410 illustrates an embodiment involving encoding at least some of the data to ensure that bit patterns associated with the encoded metadata, such as skip symbols or other codes to specify cell locations, does not match any bit pattern of data.

Block 406B provides another example in which data can be encoded to skip failed cells in the targeted storage area. As depicted at block 412, an encode flag or other notification code may be set to indicate that the data is encoded. An address of the failed cell(s) within the block may be provided as shown at block 414. As shown at block 416, the encoded information may also include an address at which to resume storing (and later retrieving) the data, or a number of cells to skip. These locations of failed cells and the resume address may be provided as location codes, whether the location codes themselves are encoded or not, to identify the location of the failed cell(s) and/or the location of an operative cell location succeeding the failed cell(s).

Figure 5B:
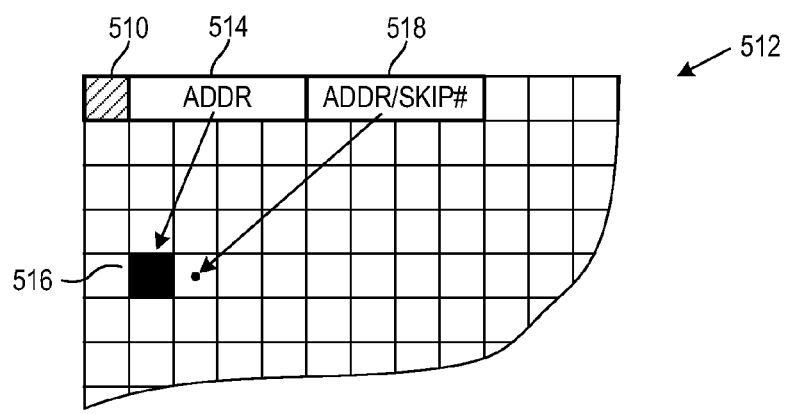

In one embodiment, flags, location information and/or other metadata are provided at a particular position in the data block, such as the beginning of the data block. FIG. 5B illustrates such an example, where an encode flag 510 is provided at the beginning of the data block 512, followed by the address 514 of the failed cell(s) 516, as well as an address or number of bits to skip 518 to where the valid data resumes.

Returning to FIG. 4, block 418 illustrates an embodiment where the data is compressed prior to applying the encoding 406, although it could alternatively or additionally be compressed after the encoding of block 406. For example, the data may be compressed 418 prior to encoding 406 the data in order to skip over failed cells. As shown at block 419, the encoded data may be directed to the memory for storage at operative storage cells on one or both sides of the failed cell, without storing any of the encoded data at the failed cells themselves. As shown at block 420, the data may be stored in the memory as encoded at block 406, or stored in the original, non-encoded manner when the targeted memory block does not exhibit any failures as determined at block 404. Thus, where the data has been encoded at block 406, the encoded data is stored such that the failed cells are skipped during storing, and any data resident at the failed cells may be removed or otherwise disregarded when later decoding the data. In one embodiment, the compression shown at block 418 is effected in connection with any of the encoding options, such that encoding the data to skip failed cells, map onto failed cells or otherwise traverse failed cells also compresses the data.

A read request targeting an encoded block of memory is identified as shown at block 421. This may be accomplished in any known fashion, such as by recognizing the address to the targeted memory block and an asserted read signal. At block 422, it is determined whether the data at the targeted memory block has been encoded, which in one embodiment indicates that the memory block has been determined to have at least one cell failure. This may be accomplished by checking the data itself, as shown at block 422A. For example, the data may be checked for an encode flag or other notification code as shown at block 424. In another example shown at block 426, the data may be examined for address and/or skip information indicative of where the failure lies. In another embodiment, a list of addresses known to have at least one failed cell and encoded information therein may be checked as shown at block 422B to make the determination whether the data is encoded data.

If it is determined at block 430 that the targeted data block has encoded data stored therein due to one or more failures in the memory block storing that data, the data is decoded as shown at block 432, and returned to the requester as shown at block 440. The decoding of block 432 may include, for example, removing or otherwise disregarding any information or metadata from the encoded data as shown at block 434, removing or disregarding bits obtained from failed cells as shown at block 436, and restoring the original data to its form prior to the previous encoding process as shown at block 438. Where the data had been compressed, it may be decompressed as shown at block 439. If the data had not been encoded or compressed, block 440 shows that the data may be returned in its current form to the requester.

Figure 6:
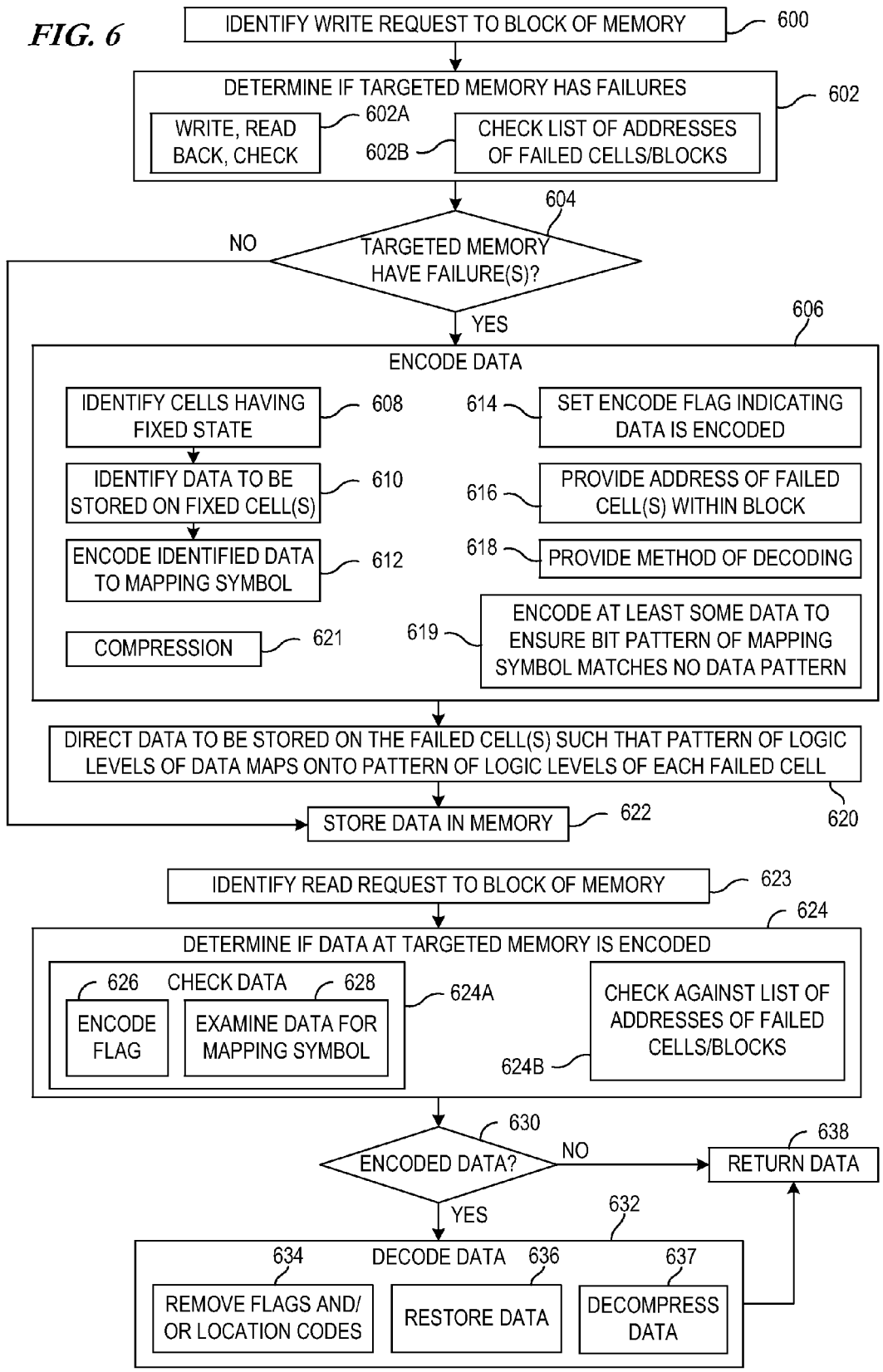
FIG. 6 illustrates a representative method for encoding data such that the valid data coincides with the bit pattern of permanently failed cells in a memory block.

As previously noted, certain storage technologies encounter hard failures that permanently place the respective storage cell at a particular logic level. Certain failure conditions in any storage technology may also cause the affected cell(s) to fail at a particular logic level. A permanent cell failure can later be read, but cannot be rewritten to a state different than the state at which is it "stuck." In one embodiment, the encoding maps the value of bits intended to be stored in a particular failed cell to the value at which the cell is stuck. FIG. 6 illustrates a representative method for encoding data such that the valid data coincides with the bit pattern of the permanently failed cells.

According to the example of FIG. 6, a write request to a block of memory is identified as shown at block 600. At block 602 it is determined whether the targeted memory block has any cell failures that are respectively stuck at particular logic levels. For example, as shown at block 602A, the data block may be written to the memory, read back from the memory, and compared to the data that was written. If the written data does not match the read data, it can be determined which cell(s) has failed. Depending on certain attributes, such as the type of storage technology used, it may be assumed that a failed cell has permanently failed at the logic state indicated during the write, read, check process shown at block 602A. In another example shown at block 602B, a list of page or other block addresses known to have failed cells may be consulted. Such a list can be maintained from results of diagnostics such as a power-on self test, periodic diagnostics, indications from error correction code use, etc. Other manners may alternatively be employed for making the determination of block 602 regarding whether the targeted memory has encountered "stuck at" hard failures.

If the targeted memory has such failures as determined at block 604, block 606 shows that the data will be encoded to re-code bit patterns in the original data into a different set of patterns, such that the new encoding maps the value of bits intended to be stored in a particular failed cell to the value at which that cell is stuck. An example of effecting such an encoding is shown in FIG. 6. As shown at block 608, memory cells that are failed in a fixed state are identified, which may be assisted by the failure determination feature shown at block 602. The data that is to be stored in the corresponding memory block is identified as shown at block 610, which may be provided by or otherwise identifiable from the write request of block 600. Block 612 shows that the identified data is encoded, such as to one or more mapping bits that can properly overlay the memory failure(s) on a bit-for-bit basis.

Figure 7A:
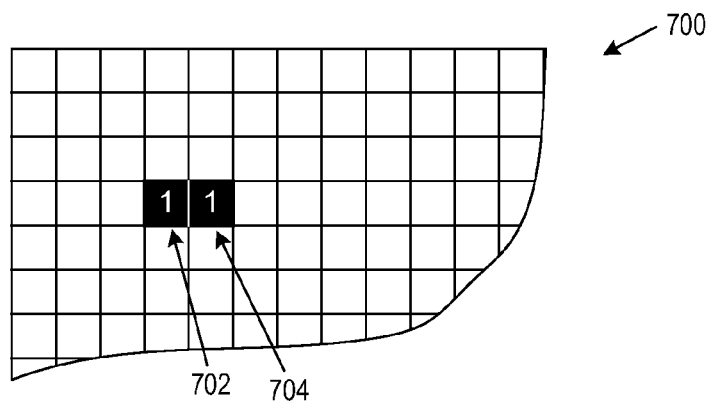
FIGS. 7A-7C depict an exemplary manner for encoding data to map bits to failed logic states of failed memory cells.
Figure 7B:
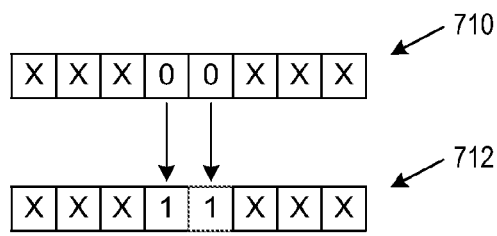
Figure 7C:
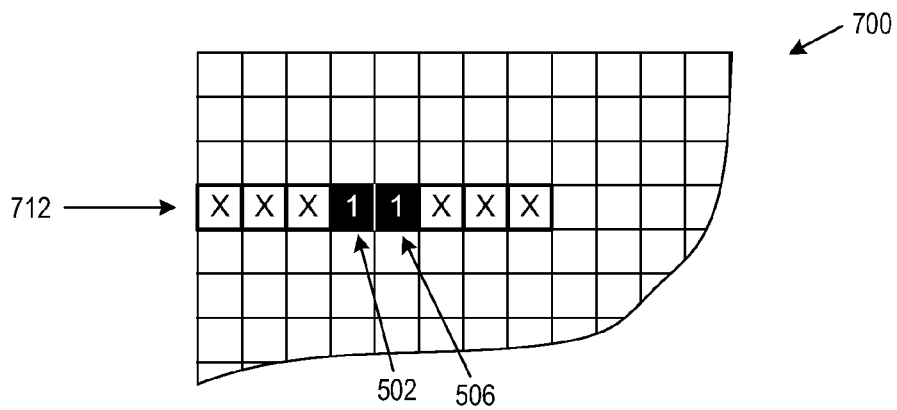

FIGS. 7A-7C provide an example in which the data may be encoded to map to the memory block having one or more hard failures. Like reference numbers are used in FIGS. 7A-7C where appropriate, and are discussed in connection with FIG. 6. FIG. 7A depicts a portion of a targeted memory block 700 having at least one failed cell 702, 704. The cells 702, 704 having failed in a fixed state are identified 608. The data portion to be stored on the fixed cells is identified 610, such as the data portion 710 of FIG. 7B. At least the data portion 710 to be stored at the failed memory cell(s) location may be encoded 612 to match the bits of the data portion 710 that will be stored at the failed cells 702, 704 to the logic state of those failed cells 702, 704. Thus, an encoding of some data portion 710 may result in an encoded symbol, code or other data portion 712 includes a bit pattern that will map onto the failed cells 702, 704.

Block 606 of FIG. 6 illustrates other alternative embodiments as well. In one embodiment shown at block 614, an encode flag or other indication may be set to indicate that data in the data block has been encoded. Another embodiment depicted at block 616 provides an address of the failed cell(s) within the data block itself. Another embodiment shown at block 618 provides an indication of how the data was encoded to assist in subsequent decoding of the data. As shown at block 619, at least some of the data to be stored at the data block may be encoded to ensure that the bit pattern(s) of the codes or symbols used to map the data onto the failed cells 702, 704 do not otherwise arise as normal data.

At block 621, an embodiment is shown where the data is compressed prior to applying the encoding of block 606, although it could alternatively be compressed after encoding, or the compression of data may be implemented as part of the encoding process. In one embodiment, the data may be compressed at block 621 prior to encoding the data at block 612 to map the encoded data to the failed cells. As shown at block 620, the encoded data may be directed to the memory for storage on the failed cells such that at least a portion of the pattern of logic levels of the encoded data maps onto the pattern of "stuck" logic levels at each of the failed cells. The encoded data is stored such that the failed state logic levels of the failed cells are exploited by mapping bits of the same logic level onto the failed cells. As shown at block 622, the data may be stored in the memory as encoded at block 606, or stored in the original, non-encoded manner when the targeted memory block does not exhibit any failures as determined at block 604.

Block 623 of FIG. 6 depicts that a read request targeting an encoded block of memory is identified. This may be accomplished in any known fashion, such as by recognizing the address to the targeted memory block and an asserted read signal. At block 624, it is determined whether the data has been encoded. This may be accomplished by, for example, checking the data itself or determining whether the address of the targeted memory block has been identified as having failures. For example, the data itself may be checked at block 624A, such as by checking for an encode flag as shown at block 626, or examining the data for address and/or encoded symbol(s) indicative of where the failure lies as shown at block 628. In another embodiment shown at block 624B, a list of addresses known to have at least one failed cell may be checked to determine if the targeted memory has any failures that have resulted in previously encoding the data.

If it is determined at block 630 that the targeted data block has encoded data stored therein due to one or more failures in the corresponding memory block, the data is decoded at block 632 and returned to the requester as shown at block 638. As shown at blocks 634 and 636, such decoding may include removing or otherwise disregarding any information or metadata from the encoded data, and restoring the block of requested data to its form prior to the previous encoding process. Where the data had been compressed, it may be decompressed as shown at block 637. If the data had not been encoded or compressed, block 638 shows that the data may be returned in its current form to the requester.

Figure 8:
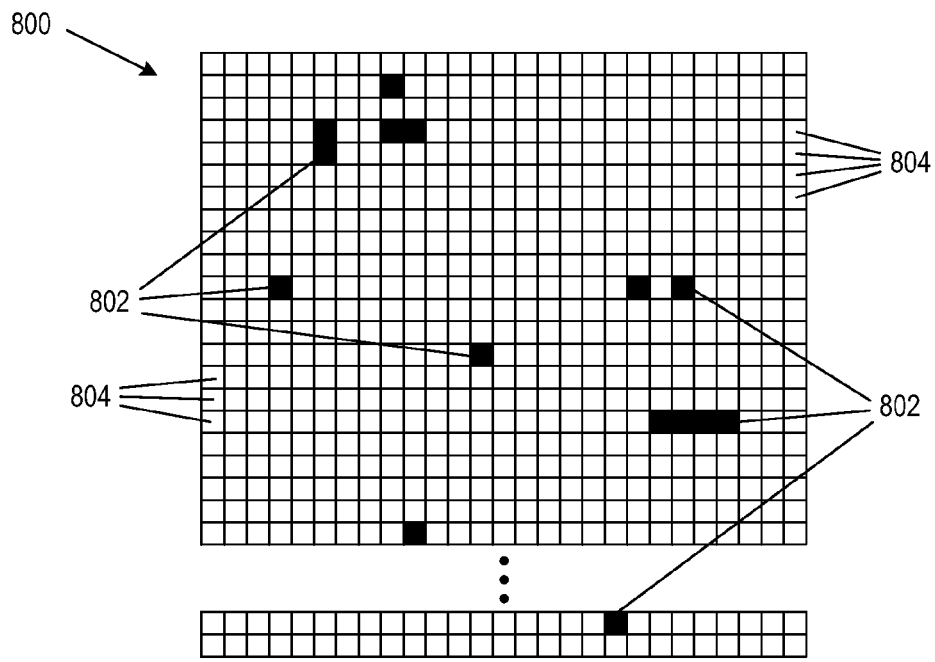
FIG. 8 depicts a memory block with decreased storage capacity due to the accumulation of failed memory cells.

As memory failures accumulate, memory capacity may decrease. This is depicted in FIG. 8, which shows both operative cells and failed cells in a physical memory area 800 in which a data block may be targeted for storage. In the illustration, failed cells are shown darkened, such as failed cells 802. The remaining cells, examples of which include cells 804, represent the operative cells of the memory area 800. As the number of cells fail, memory capacity decreases, and will decrease more rapidly where entire memory pages or other blocks are decommissioned in view of cell failures. In accordance with one embodiment, encoding the data involves compressing the data to enable it to fit within the targeted memory block despite the cells failures afflicting it.

Figure 9:
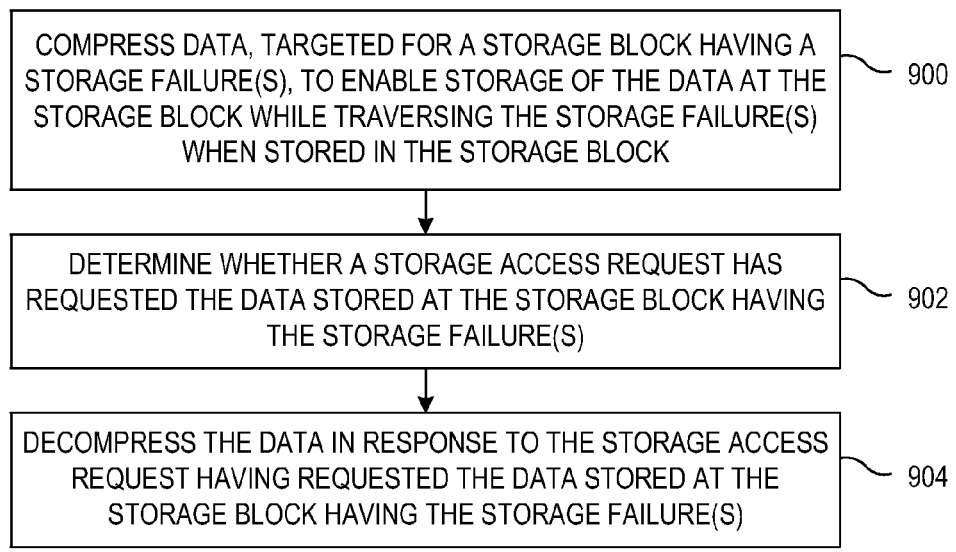
FIG. 9 is a flow diagram illustrating an embodiment for encoding data through compression to traverse or otherwise avoid failed cells in a targeted storage block.

FIG. 9 is a flow diagram illustrating an embodiment for encoding data through compression to traverse or otherwise avoid failed cells in a targeted storage block. Data is compressed as shown at block 900 to enable it to be stored at the storage block, while traversing the storage failures when ultimately stored in the block. Any suitable compression technique may be implemented, although one embodiment involves lossless compression to preserve the integrity of the data when decompressed. Lossy compression may be used where the use of the data, when retrieved, can tolerate some degree of variation between the original data and the decompressed data. The compression can be effected by either software-controlled and/or hardware-controlled failure management.

A storage access request, such as a read request, may be issued by a requesting device to retrieve previously stored data. As shown at block 902, it is determined whether a received request has been made for data stored at the storage block having the storage failures. If so, the request would in effect be requesting compressed data, although this may be unknown to the requester. In response to a determination that the request indeed targeted compressed data at a storage block having one or more cell failures, the data stored therein is decompressed as shown at block 904. Thus, as cell failures accumulate, the targeted storage block exhibiting the failures can still be utilized. The addressable storage capacity of the storage device can appear to remain constant, or at least decrease more slowly than without the compression.

Figure 10:
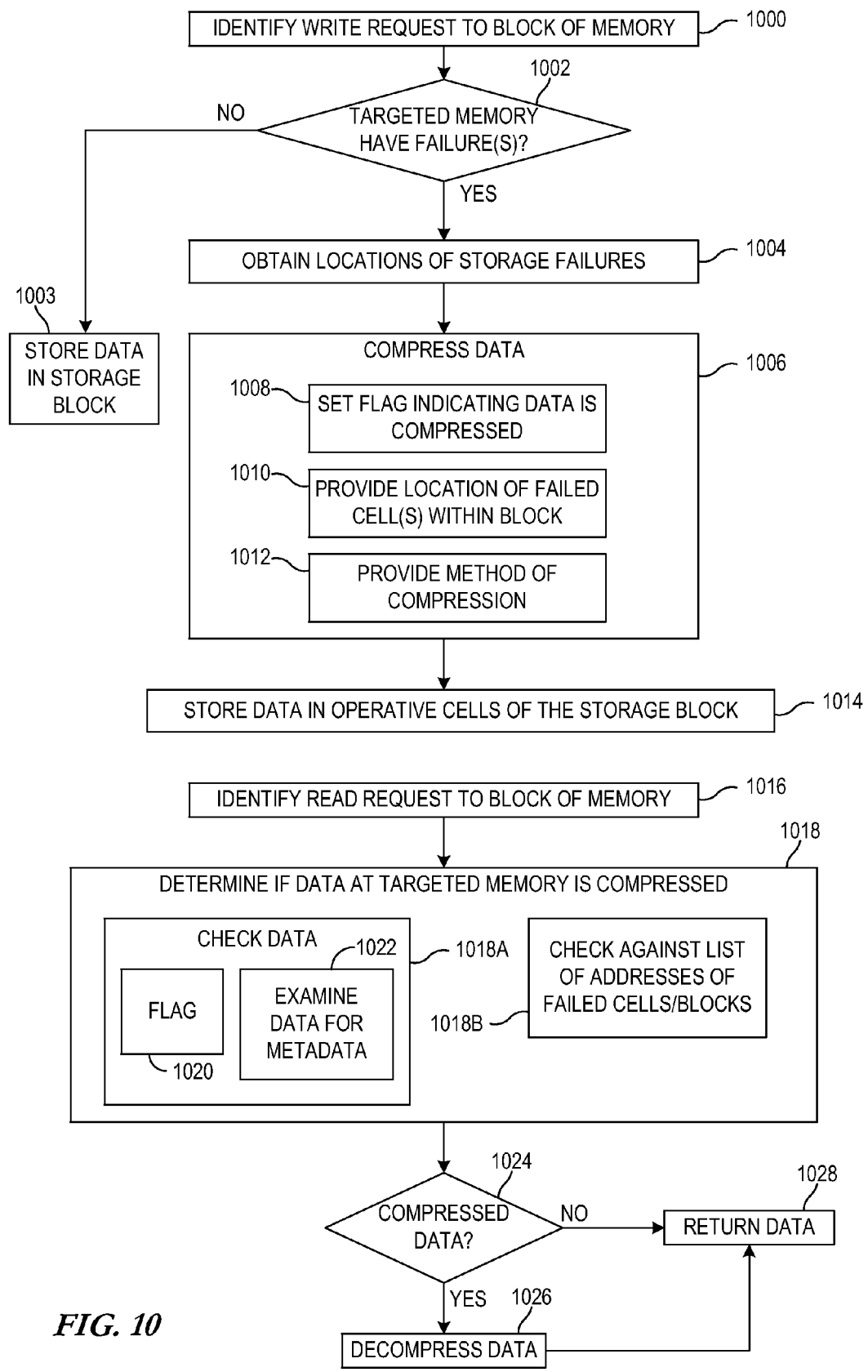
FIG. 10 is a flow diagram illustrating an embodiment in which compression techniques may be used independently of other encoding techniques.

As noted by FIG. 9, compression techniques are used independently of previously described encoding techniques that may skip over or pass through failed cells. FIG. 10 is a flow diagram illustrating another embodiment in which compression techniques may be used independently of other encoding techniques. In the illustrated embodiment, block 1000 depicts that a write request to a block of memory is identified. It is determined at block 1002 whether the targeted memory block exhibits cell failures. For example, data may be written to and read back from the block, and the written data can be compared to the read data to identify mismatches of data indicative of cell failures. Alternatively, records of memory blocks having failures may be consulted, such as a record of failed cell locations obtained via power-on self test, error correction techniques, or the like.

If no cell failures are present, the data may be stored in the memory without being compressed, as shown at block 1003. In other embodiments, the data may be compressed even though the data is targeted for a memory block that does not exhibit any cell failures. If the determination of block 1002 indicates that any cell failures are present, the locations of any such storage failures are obtained as shown at block 1004. Data may be compressed at block 1006 to fit information content of the original, uncompressed data into a smaller space than that required by the original uncompressed form of the data. For example, knowing the location of the storage failures in the block, contiguous sections of operative cells separated by the failed cells can be identified. The data may be compressed to fit into one or more of the contiguous sections of such operative cells. In one embodiment, the compression is performed on the communication path between a device requesting data storage and the memory, such as at a separate encoder or other compressing device, at a memory controller, etc. If software, such as an operating system, is aware of which cells have failed, software can be provided to perform the compression. Read or write requests can be intercepted from the application, and the compression can be performed on data addressed to memory blocks having failed cells.

Flags and/or other metadata may, in some embodiments, be provided with the compressed data to facilitate decompression of the data when the compressed data is later requested. For example, a flag indicating that the data is compressed may be set as shown at block 1006. As shown at block 1008, a flag or other metadata may be provided within the data at any desired location, such as at the beginning or end of a data block that has been compressed. When the data block is read, the flag or metadata location may be checked to determine whether the data block is compressed. The compressed data may also provide an address or other location of the failed cell(s) within the memory block, as shown at block 1010. The address or location of the failed cell(s) may be used when decompressing the data to identify where in the addressable data block the compressed data is stored. Yet another example shown at block 1012 involves providing an indication of the method of compression used. Providing an indication of the compression technique used may be particularly beneficial if one of a plurality of compression techniques may be employed. For example, different compression techniques may be used depending on parameters such as the level of compression desired for a particular block, the type of data stored at a particular block (e.g., data which may use lossy versus lossless compression), or the like.

As shown at block 1014, the compressed data may be stored in the operative cells of the storage block, while avoiding storage of data at the failed cell locations. In a particular example, given a memory region partitioned into smaller regions, each including an adjacent set of operative cells and another adjacent set of failed cells, the data originally mapped to both the operative and failed sets of cells can be encoded for storage in the operative sets only. In one embodiment, if the data can no longer be compressed, system software can be notified via an interrupt or analogous notification mechanism to manage this condition.

As shown at block 1016, a read request targeting an encoded block of memory is identified. It is determined at block 1018 whether the data at the targeted memory block has previously been compressed due to the presence of one or more storage failures. This may be accomplished by checking the data itself, as shown at block 1018A. Examples of checking the data itself are shown at blocks 1020 and 1022, which respectively includes checking for a flag indicating that the data had been compressed, and/or examining the data for metadata such as failure location information or other encoded symbol(s) indicative of where the failure lies. In another embodiment, a list of addresses known to have at least one failed cell may be checked at block 1018B to determine if the targeted memory block has been compressed due to failures therein. Another embodiment may employ multiple manners for determining whether data is compressed, such as first checking a list of addresses known to have at least one failed cell, and then check the data itself for a flag or other metadata. Alternatively, the data may be checked first for a flag or metadata, followed by checking a list of addresses known to have a failed cell(s) to provide verification in the event that the data location(s) storing the flag or metadata has failed.

If it is determined at block 1024 that the targeted data block has compressed data stored therein, the data is decompressed at block 1026 and returned to the requester as shown at block 1028. In the case of lossless compression, decompression will return the data to its original form. For lossy compression, decompression may return the data to a form acceptably close to the original form to suit its purposes. In some embodiments, an indication of the compression/decompression technique used is provided with the data, although the decompression or other decoding module may be aware of the decompression technique without such information. If the data had not been compressed, it may be returned 1028 in its current form to the requester.

Figure 11:
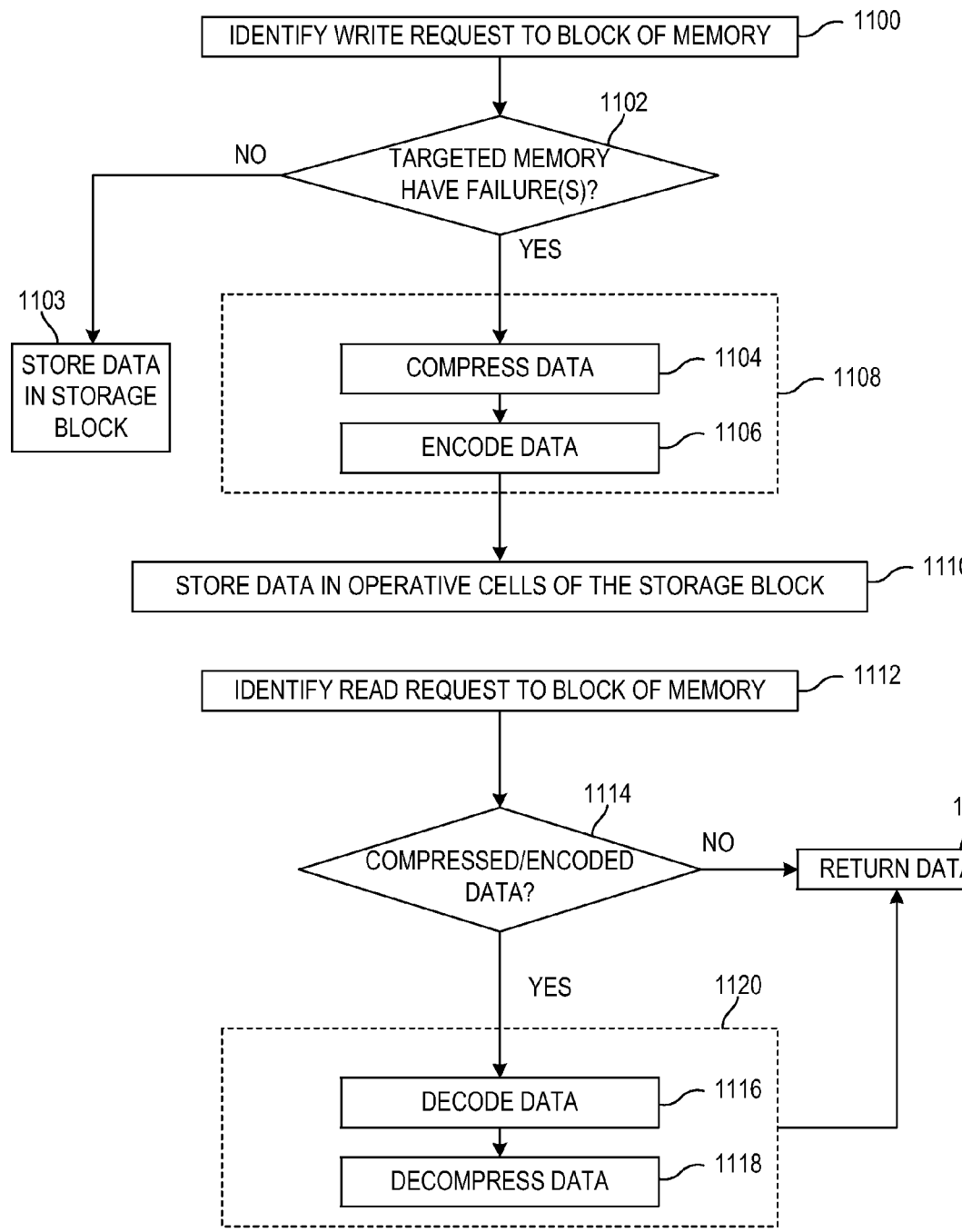
FIG. 11 is a flow diagram of an embodiment that both compresses and encodes data to traverse the cell failures in a targeted storage block.

As seen from the foregoing, the compression techniques described herein may be used independently to avoid one or more failed cells in an area of the memory block. Alternatively, the compression may be used in combination with other encoding embodiments described herein. FIG. 11 is a flow diagram of an embodiment that both compresses and encodes data to traverse the cell failures in a targeted storage block. A write request to a block of memory is identified at block 1100. As shown at block 1102, it is determined whether the targeted memory block exhibits any hard failures. If not, the data may be stored in the memory without being encoded and/or compressed, as shown at block 1103. If the determination of block 1102 indicates that the targeted memory block includes one or more cell failures, the data may be both compressed and encoded in the manners described herein, as shown at blocks 1104 and 1106 respectively. In one embodiment, the data is collectively encoded such that it both compresses the data and encodes it to skip over or pass through failed cells using the same encoding process. For example, some information may be encoded to identify locations one or more failed cells, while encoding the data to be stored in the data block such that fewer bits are used to represent the same data. An example is depicted by block 1108, which represents an encoding process that both compresses and encodes the data as described herein. Block 1110 shows that the compressed and encoded data may be stored in the operative cells of the storage block, while avoiding storage of data at the failed cell locations. Among other things, this embodiment provides the appearance that the memory size remains constant despite cell failures, provides efficient use of the operative cells in a memory block exhibiting cell failures, and provides for a continuous address space across memory blocks.

At some time a read request targeting an encoded block of memory may be identified as shown at block 1112. At block 1114, it is determined whether the data at the targeted memory block has previously been compressed and encoded due to the presence of one or more storage failures. If it is determined at block 1114 that the targeted data block includes compressed/encoded data stored, the data is decoded 1116 and decompressed 1118, and ultimately returned to the requester as shown at block 1122. In one embodiment, the data is collectively decoded such that it both decompresses and decodes the data using the same decoding process. This is depicted by block 1120, which represents a decoding process that both decompresses and decodes the data as described herein. In other embodiments, symbols and other encoded data may be decoded by a first process, and the stored data may be decompressed by a second process. If the data had not been compressed or encoded, block 1122 shows that the data may be returned in its current form to the requester.

Figure 12:
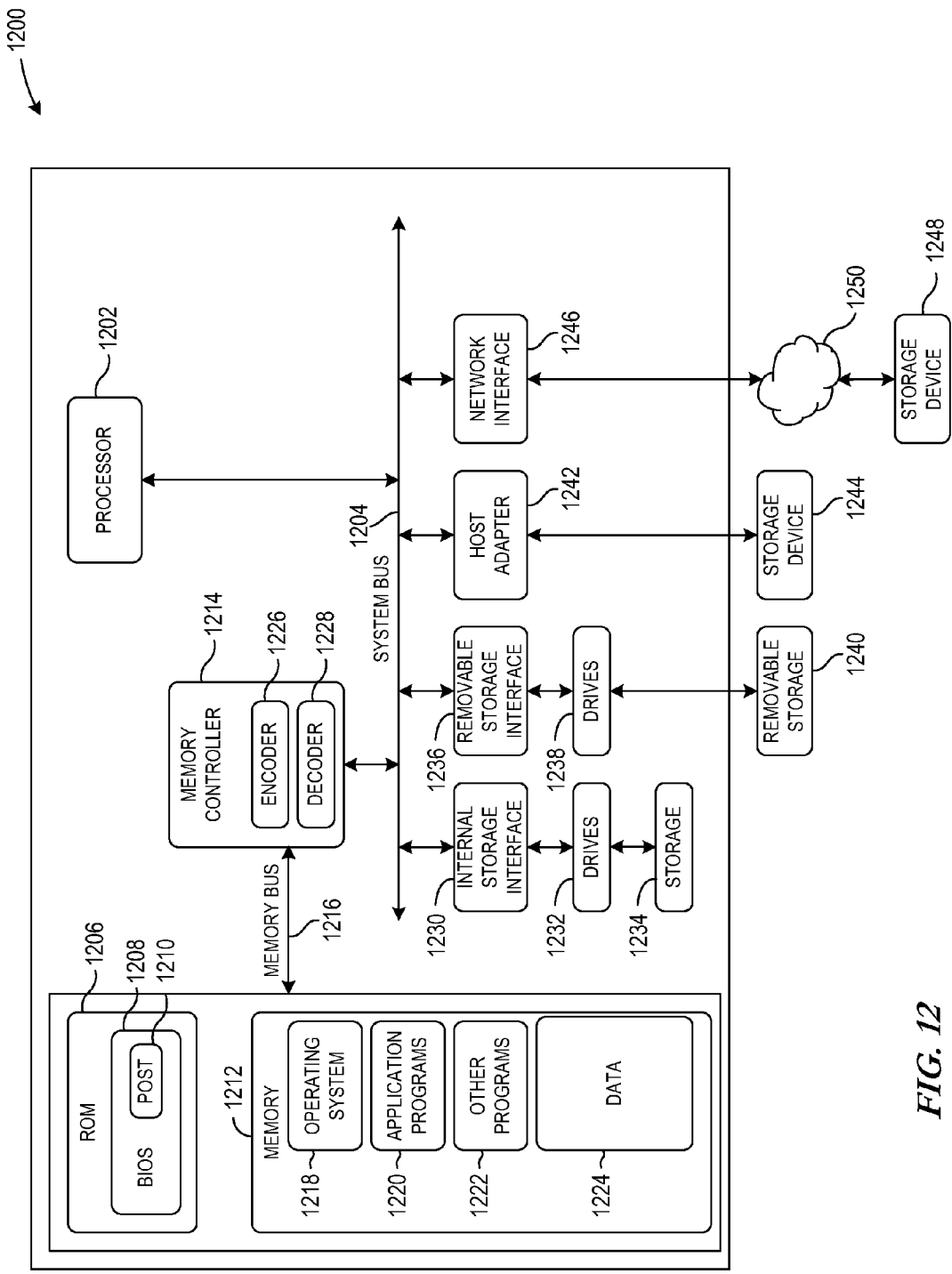
FIG. 12 depicts a representative computing system in which the encoding principles may be implemented.

FIG. 12 depicts a representative computing system 1200 in which the principles described herein may be implemented. The computing environment described in connection with FIG. 12 is described for purposes of example, as the structural and operational disclosure for managing storage failures is applicable in any environment in which data storage may be implemented. It should also be noted that the computing arrangement of FIG. 12 may, in some embodiments, be distributed across multiple devices.

The representative computing system 1200 includes a processor 1202 coupled to numerous modules via a system bus 1204. The depicted system bus 1204 represents any type of bus structure(s) that may be directly or indirectly coupled to the various components and modules of the computing environment. Among the various components are storage devices, any of which may benefit from the storage failure management disclosure provided herein.

A read only memory (ROM) 1206 may be provided to store firmware used by the processor 1202. The ROM 1206 represents any type of read-only memory, such as programmable ROM (PROM), erasable PROM (EPROM), or the like. The ROM 1206 includes the basic input/output system (BIOS) 1208, which includes the code for performing a power-on self test (POST). Generally, the POST is executed upon power-on or reset of the system 1200, and performs diagnostics on at least a memory 1212. If hard failures exist in memory cells of the memory 1212, the addresses at which such failures occur can be logged. Some embodiments of the failure management system described herein utilize such logged memory failures to identify the location of failures to perform encoding and/or compression techniques previously described. Discovery of storage failures may be accomplished using any memory or storage diagnostic procedure, and need not be associated with a POST.

The host or system bus 1204 may be coupled to a memory controller 1214, which in turn is coupled to the memory 1212 via a memory bus 1216. The exemplary memory 1212 may store, for example, all or portions of the operating system 1218, application programs 1220 and other programs 1222, and data 1224. The data 1224 may be written to the memory 1212 in blocks, such as pages, which are stored in respective blocks of the memory 1212. Cells of the memory blocks may experience "hard" failures as previously described, to which the encoding and/or compression techniques and structures described herein can manage.

Among other things, the memory controller 1214 may manage the flow of data to/from the processor 1202. In one embodiment, an encoder 1226 and decoder 1228 are implemented at the memory controller 1214. The encoder 1226 may be used to perform the encoding to skip failed memory cells, map data onto failed memory cells, compress data to avoid failed memory cells, and/or other encoding functions described herein. The decoder 1228 performs the decoding and/or decompression to return the encoded data to its original form prior to returning data to the memory 1212. The exemplary encoder 1226 and decoder 1228 are depicted as hardware or software modules at the memory controller 1214, although they may be implemented separate from the memory controller 1214 or other circuitry.

The failure management aspects described herein may be applied to any storage, including volatile storage such as memory 1212, as well as non-volatile storage devices. FIG. 12 illustrates various other representative storage devices in which data may be encoded to work around hard failures. For example, the system bus may be coupled to an internal storage interface 1230, which can be coupled to a drive(s) 1232 such as a hard drive. Storage media 1234 is associated with or otherwise operable with the drives. Examples of such storage include hard disks and other magnetic or optical media, flash memory and other solid-state devices, etc. The internal storage interface 1230 may utilize any type of volatile or non-volatile storage. Data may be encoded as described herein to manage hard failures associated with such storage media 1234.

Similarly, an interface 1236 for removable media may also be coupled to the bus 1204. Drives 1238 may be coupled to the removable storage interface 1236 to accept and act on removable media such as, for example, floppy disks, optical disks, memory cards, flash memory, external hard disks, etc. Data may be encoded as described herein to manage hard failures associated with such storage 1234, 1240. For example, even write once, ready many (WORM) storage can benefit from the storage failure management principles described herein, as failures may be discovered prior to the permanent storage of data at which time the encoding may be implemented.

In some cases, a host adaptor 1242 may be provided to access external storage 1244. For example, the host adaptor 1242 may interface with external storage devices via small computer system interface (SCSI), Fibre Channel, serial advanced technology attachment (SATA) or eSATA, and/or other analogous interfaces capable of connecting to external storage 1244. By way of a network interface 1246, still other remote storage may be accessible to the computing system 1200. For example, wired and wireless transceivers associated with the network interface 1246 enable communications with storage devices 1248 through one or more networks 1250. Storage devices 1248 may represent discrete storage devices, or storage associated with another computing system, server, etc. Communications with remote storage devices and systems may be accomplished via wired local area networks (LANs), wireless LANs, and/or larger networks including global area networks (GANs) such as the Internet. Data may be encoded as described herein to manage hard failures associated with such external storage devices 1244, 1248.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method for managing failures in a storage device, comprising:
   encoding data, addressed to a storage block having at least one storage failure, to enable the data to be stored such that the stored data traverses the at least one storage failure without data corruption when stored in the storage block, the encoding including compressing at least some of the data;
   determining whether a storage access request targets the data stored at the storage block having the at least one storage failure; and
   decoding the data in response to determining that the storage access request targets the data stored at the storage block having the at least one storage failure.

2. The method of claim 1, further comprising directing the encoded data to be stored at operative storage cells of the storage block on each side of the at least one storage failure having at least one failed storage cell without storing any of the encoded data in the at least one failed storage cell.

3. The method of claim 1, wherein:
   encoding data comprises including within the data one or more location codes to identify a location of the at least one storage failure and a location of an operative storage location succeeding the at least one storage failure; and
   decoding the data comprises disregarding any bits of the data retrieved from the location of the at least one storage failure as identified by the one or more location codes, and discarding at least the location codes to restore the data to its form prior to the encoding.

4. The method of claim 3, wherein:
   encoding data further comprises including a notification code within the data to indicate that the data has been encoded;
   determining whether a storage access request targets the data stored at the storage block comprises examining the notification code to determine that the data has been encoded; and
   decoding the data further comprises removing the notification code to restore the data to its form prior to the encoding.

5. The method of claim 3, wherein the encoding further comprises encoding at least some of the data to be stored to form encoded data to ensure that none of the data to be stored has a bit pattern matching the location codes, and wherein decoding further comprises restoring the encoded data to their respective original bit patterns.

6. The method of claim 3, wherein encoding the data further comprises compressing the at least some of the data to enable the encoded data to fit into the storage block notwithstanding the at least one storage failure.

7. The method of claim 1, wherein encoding the data comprises converting at least some of the data to a code having one or more bits set to a pattern of logic levels respectively corresponding to a pattern of logic levels of each of the at least one storage failures.

8. The method of claim 7, further comprising storing the encoded data in the storage block such that at least part of the code is stored on the at least one storage failure, and the pattern of logic levels of the code maps onto the pattern of logic levels of each of the at least one storage failures.

9. The method of claim 7, wherein encoding the data further comprises compressing the at least some of the data to enable the encoded data to completely fit into the storage block without data loss, notwithstanding the at least one storage failure.

10. The method of claim 7, wherein decoding the data comprises converting the code back to the data from which the code was formed, and restoring the data to its form prior to the encoding.

11. The method of claim 1, wherein encoding the data comprises compressing the at least some of the data to enable the encoded data to fit into the storage block having the at least one storage failure.

12. The method of claim 1, further comprising:
obtaining a location of the at least one storage failure;
identifying one or more segments of contiguous operative cells that do not include the at least one storage failure; and
storing the at least some of the data that is compressed by the compressing in the one or more segments of contiguous operative cells.

13. An apparatus comprising:
an encoder configured to receive a data block targeted for storage in a memory block having one or more cell failures, and to encode the data block for storage in the memory block while traversing the one or more cell failures, including compressing at least some of the data block;
a data block identification module configured to receive stored data and identify that the stored data includes the encoded data block from the memory block having the one or more cell failures; and
a decoder coupled to the data block identification module to receive the encoded data block and account for bits from the one or more cell failures as directed by the encoded data, and to restore the encoded data to its original form prior to the encoding.

14. The apparatus of claim 13, wherein:
the encoder is configured to encode the data block by providing codes to identify locations of the one or more cell failures and of the operative cells succeeding the one or more cell failures; and
the decoder is configured to account for the bits from the one or more cell failures by skipping bits at the locations of the one or more cell failures and accepting bits from the locations of the operative cells preceding and succeeding the one or more cell failures.

15. The apparatus of claim 13, wherein:
the encoder is configured to encode the data block by providing one or more codes each having one or more bits set to a pattern of logic levels respectively corresponding to a pattern of logic levels of each of the one or more cell failures; and
the decoder is configured to restore the data to its form prior to the encoding, and to account for the bits from the one or more cell failures by accepting the bits from the one or more cell failures as part of the restored data.

16. The apparatus of claim 13, wherein the encoder further comprises a compression module configured to compress the at least some of the data block to enable encoded data in the encoded data block to fit into the memory block that has the one or more cell failures.

17. An apparatus comprising:
a memory having memory cells addressable in memory blocks;
a processor configured to issue requests to write data blocks to the memory blocks, and to issue requests to read the data blocks from the memory blocks; and
a failure management module coupled between the processor and the memory to intercept the write and read requests, the failure management module comprising:
an encoder configured to encode the data blocks identified by the write requests for storage in any partially-failed memory block having at least one memory cell failure, including compressing at least some data in the data blocks, and to enable storage of the data blocks in the respective partially-failed memory block so the data traverses the memory cell failure when the respective data block is stored in the respective partially-failed memory block; and
a decoder configured to decode the data blocks retrieved from any of the partially-failed memory blocks in response to the read requests to restore the retrieved data block to its form prior to the encoding.

18. The apparatus of claim 17, wherein:
the encoder is further configured to specify a location of the memory cell failure in the respective partially-failed memory block, and to direct the data block to be stored in the partially-failed memory block while skipping the memory cell failure as directed by the specified locations; and
the decoder is further configured to remove from the retrieved data block at least any bits retrieved from the memory cell failure and restore the retrieved data block to its form prior to the encoding.

19. The apparatus of claim 17, wherein:
the encoder is further configured to direct the data block to be stored through the memory cell failure in the partially-failed memory block such that at least a bit of the encoded data is mapped onto the memory cell failure in the same logic state in which the memory cell failure failed; and
the decoder is further configured to restore the data to its form prior to the encoding, and to accept the bit that was mapped onto the memory cell failure as part of the restored data.

20. The apparatus of claim 17, wherein the failure management module further comprises a compression module configured to compress the data blocks to enable the encoded data to fit into its respective partially-failed memory block.

* * * * *